United States Patent
Bostick et al.

(10) Patent No.: US 9,876,951 B2
(45) Date of Patent: Jan. 23, 2018

(54) IMAGE SUBJECT AND COMPOSITION DEMAND

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 14/864,962

(22) Filed: Sep. 25, 2015

(65) Prior Publication Data

US 2017/0094160 A1 Mar. 30, 2017

(51) Int. Cl.
*H04N 5/232* (2006.01)
*G06F 17/30* (2006.01)

(52) U.S. Cl.
CPC ... *H04N 5/23222* (2013.01); *G06F 17/30268* (2013.01)

(58) Field of Classification Search
CPC .............................................. H04N 2201/3353
USPC ........................................................ 348/231.3
See application file for complete search history.

(56) References Cited

U.S. PATENT DOCUMENTS

| | | | |
|---|---|---|---|
| 5,164,998 A | 11/1992 | Reinsch | |
| 8,073,792 B2 | 12/2011 | Hughes | |
| 8,810,599 B1* | 8/2014 | Tseng | G06T 7/0018 340/435 |
| 2012/0005182 A1 | 1/2012 | Monteverde | |
| 2014/0002440 A1 | 1/2014 | Lynch | |
| 2014/0301645 A1 | 10/2014 | Mattila | |

FOREIGN PATENT DOCUMENTS

| | | |
|---|---|---|
| KR | 1020130049351 A | 5/2013 |
| WO | 2006036781 A2 | 4/2006 |

OTHER PUBLICATIONS

Dias et al., "GIS2R—Framework de Realidade Aumentada ePanoramas 360° para Geomarketing" "GIS2R—Augmented Reality and 360° Panoramas Framework for Geomarketing", provided on search report dated Jan. 21, 2015, 5 pages.

Lin et al., "Augmented Reality Assisted Photo Positioning for Mobile Devices", pp. 4759-4764, 2013 IEEE Wireless Communications and Networking Conference (WCNC): Services & Applications, 978-1-4673-5939-9/13, © 2013 IEEE.

(Continued)

*Primary Examiner* — Joel Fosselman
(74) *Attorney, Agent, or Firm* — David B. Woycechowsky

(57) ABSTRACT

A method, computer program product and computer system is provided. A processor identifies a location of a user. A processor determines a subject based on the location of the user. A processor determines a composition factor associated with the subject. A processor determines a popularity score for the subject based, at least in part on, a plurality of search queries from a plurality of users. Responsive to the popularity score for the subject being above a threshold, a processor sends a suggestion for an image including the subject and the composition factor associated with the subject.

18 Claims, 5 Drawing Sheets

(56) References Cited

OTHER PUBLICATIONS

Zigkolis et al., "Detecting the long-tail of Points of Interest in tagged photo collections", 978-1-61284-433-6/11/, © 2011 IEEE, pp. 235-240.

"Method and System to Stream Data and Images in Response to Real Time Photography Requests", An IP.com Prior Art Database Technical Disclosure, Authors et. al.: Disclosed Anonymously, IP.com No. 000238241, IP.com Electronic Publication: Aug. 12, 2014, pp. 1-3.

"Method for Optimum Viewpoint for Drone Photography Based on User Commands", An IP.com Prior Art Database Technical Disclosure, Authors et. al.: Disclosed Anonymously, IP.com No. 000239970, IP.com Electronic Publication: Dec. 18, 2014, pp. 1-3.

* cited by examiner

IMAGE SUBJECT AND COMPOSITION DEMAND

BACKGROUND OF THE INVENTION

The present invention relates generally to the field of photography, and more particularly to providing suggestions for subjects and composition of a photograph.

In general, composition includes the act of combining pieces or other elements to create a whole result. In photography, composition is the inclusion and arrangement of various objects and other visual design elements within an image. An image may include one or more subjects such as a person, object, landmark, or building. Also, the subject may be captured in a certain manner, such as perspective or lighting. The arrangement of subjects and inclusion of various different design elements contribute to the desirability of the captured image.

SUMMARY

Embodiments of the present invention provide a method, system, and program product to provide demand and desired compositions of image subjects. A processor identifies a location of a user. A processor determines a subject based on the location of the user. A processor determines a composition factor associated with the subject. A processor determines a popularity score for the subject based, at least in part on, a plurality of search queries from a plurality of users. Responsive to the popularity score for the subject being above a threshold, a processor sends a suggestion for an image including the subject and the composition factor associated with the subject.

DETAILED DESCRIPTION

Figure 1:
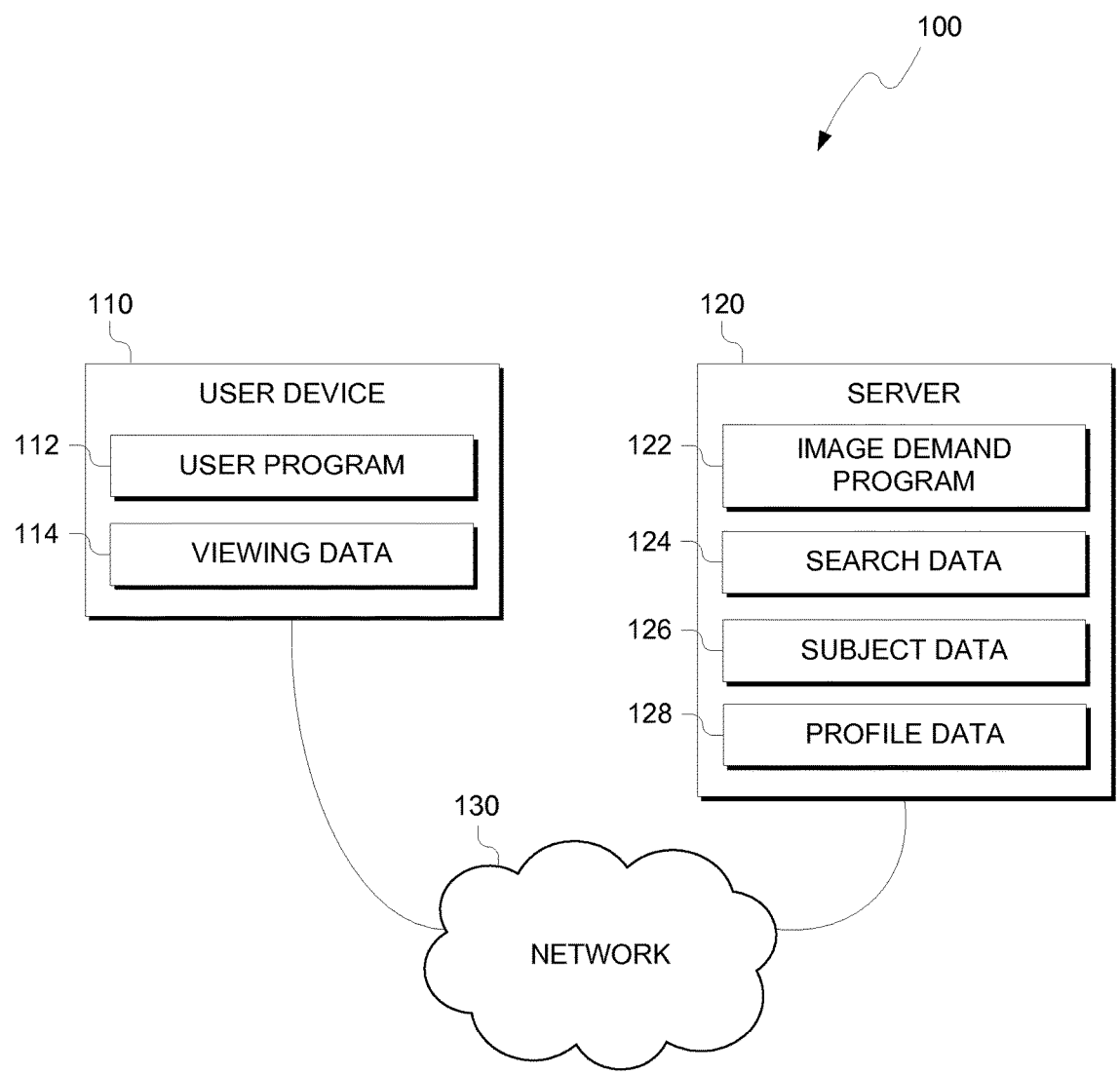
FIG. 1 is a functional block diagram illustrating a networked environment, in accordance with an exemplary embodiment of the present invention.

While solutions to suggesting subjects and compositions for images are known, they typically follow a set of paradigms without concrete support. Embodiments of the present invention recognize that by analyzing available search queries collected by a variety of websites, dynamic and currently relevant subjects and compositions can be suggested to a user. By providing suggestions based on the search queries made by users, resulting images containing the suggested subjects may be more popular than images captured without such subjects. Additionally, by performing contextual analysis to the search queries, embodiments of the present inventions provide desired compositions of the subjects. Furthermore, by providing such suggestions when a user is near and, in some scenarios, viewing popular subjects, embodiments of the present invention recognize that a user may quickly determine popular subjects and receive desired compositions of the subjects in proximity. Also, by analyzing a profile of a user, embodiments of the present invention provide suggestions of subjects and corresponding desired compositions of the subjects. For example, a travel itinerary is provided with a profile of a user. Embodiments of the present invention provide suggestions for subjects near locations indicated in the itinerary, as well as any desired compositions of images containing the suggested subjects.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes user device 110 and server 120 connected over network 130. User device includes user program 112 and viewing data 114. Server 120 includes image demand program 122, search data 124, subject data 126 and profile data 128.

In various embodiments of the present invention, user device 110 and server 120 are each a computing device that can be a standalone device, a server, a laptop computer, a tablet computer, a netbook computer, a personal computer (PC), or a desktop computer. In another embodiment, user device 110 and server 120 each represent a computing system utilizing clustered computers and components to act as a single pool of seamless resources. In general, both user device 110 and server 120 can be any computing device or a combination of devices with access to viewing data 114, search data 124, subject data 126 and profile data 128 and is capable of executing user program 112 and image demand program 122. Both user device 110 and server 120 may include internal and external hardware components, as depicted and described in further detail with respect to FIG. 5.

In this exemplary embodiment, user program 112 and viewing data 114 are stored on user device 110. Furthermore, image demand program 122, search data 124, subject data 126 and profile data 128 are stored on server 120. However, in other embodiments, user program 112, viewing data 114, image demand program 122, search data 124, subject data 126 and profile data 128 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between user device 110 and server 120, in accordance with a desired embodiment of the present invention.

In various embodiments, server 120 includes image demand program 122. Image demand program 122 determines popular subjects and desired compositions when capturing images of a respective subject. Image demand program 122 determines popular subjects based on search data 124. In some embodiments, search data 124 includes various search queries for images. In some scenarios, server 120 provides a search engine for images. Server 120 may host images or server 120 may index images across multiple websites or other platforms. For example, server 120 may be operated by a social network provider where users can post images. Additionally, server 120 receives search queries from users for images posted on the social network. As such, image demand program 122 stores received search queries in search data 124.

In other scenarios, another computing device (not shown) is operated to provide image search functions. Image demand program 122 retrieves search queries for images from the computing device and stores the search queries in search data 124. For example, another server provides an image hosting platform in addition to an image search function for images hosted on the image hosting platform. Image demand program 122 retrieves search queries from the image hosting platform made by users of the image hosting platform. In other embodiments, search data 124 includes search queries from more than one server, website, platform, or any combination thereof. For example, search data 124 includes search queries from a social network and a search engine. In this example, server 120 is operated by an owner or provider of the search engine and another server (not shown) is operated by an owner or provider of the social network.

In various embodiments, image demand program 122 determines the content of the search queries in search data 124. Image demand program 122 determines the subject of the search queries. A subject of a search query is an object, person, place or thing a search query is directed towards. For example, a search query of "Night time shot of the Eiffel Tower" is received. In the above query, the subject is "Eiffel Tower". In various embodiments, image demand program 122 determines a desired composition of the received search queries. Again referring to the above example, the desired composition of the search query is "Night time".

In various embodiments, a desired composition of a search query refers to any characteristic or factor that can influence an image of the subject when captured. Example composition factors include, but are not limited to, a time of day, weather conditions, location, perspective, framing, orientation, included background objects, or an arrangement of subjects to be captured in an image. Additionally, composition factors may include any visual effect or alteration to an image such as vignetting, color (e.g., hues, brightness or saturation), lighting arrangements, and the like that can be applied pre or post process to the image. Furthermore, a search query may have multiple desired composition factors. For example, "sepia tone image of a snowy mountain" is a received search query. In this example, image demand program 122 determines the subject to be "mountain" with desired composition factors "sepia tone" and "snowy".

For each search query in search data 124, image demand program 122 determines the subject and composition factors of a search query based on the text of the search query. Image demand program 122 performs of ontological based contextual analysis on the search query to determine basic objects of each query (i.e., subjects) and attributes of the objects (i.e., composition factors). In some embodiments, image demand program 122 also determines a class of the object in a search query in order to categorize similar objects (e.g., an automobile class would cover objects named "car", "van" or "truck"). In various embodiments, image demand program 122 determines the requested subject and desired composition of an image search query based on the object represented by the search query and the attributes of the object represented by the search query.

In various embodiments, image demand program 122 determines the demand, frequency or popularity of subjects indicated among the search queries in search data 124. Image demand program 122 stores the popularity of each subject, and in some embodiments classes of subjects, in subject data 126. Subject data 126 includes entries for each subject determined to be present in search data 124. For example, for each query containing a subject, image demand program 122 increases a popularity score of the subject. As another example, for each query containing a subject, an average popularity score is increased for the subject while other subjects' average popularity scores are decreased. In some embodiments, each subject in subject data 126 includes a class the subject is categorized under. In other embodiments, subject data 126 includes entries for various classes of subjects, with determined subjects in search queries categorized within the various classes.

In various embodiments, image demand program 122 determines the popularity of various composition factors associated with subjects indicated in each search query of search data 124. For example, three search queries with the same subject are present in search data 124: (1) "Mount Rushmore at sunset"; (2) "Mt. Rushmore during the day"; and (3) "Mount Rushmore at dusk". Two search queries indicate preferences for images of Mount Rushmore in the early evening (i.e., dusk and sunset). One search query indicates a preference for a daytime image. In this example, image demand program 122 determines that "early evening" is a desired composition with regards to images with subjects of Mount Rushmore. One of ordinary skill in the art will appreciate that any metric and process to determine the popularity of subjects among the search queries of search data 124 and the popularity of compositions associated with each subject may be used without deviating from the invention.

In various embodiments, subject data 126 includes a location or type of locale for each subject. In some embodiments, image demand program 122 determines a location for the subject. For example, the subject is a known landmark, such as the Washington Monument. In such a scenario, image demand program 122 searches an electronic map for the landmark's name to determine a geographical location (e.g., latitude/longitude coordinates, a city name, zip code, or the like). In another example, the subject may not have a specific location but a generalized location, such as a particular beach or a mountain. In such a scenario, image demand program 122 searches an electronic map for the subject and sets the location of the subject to the surrounding area of the subject. As another example, the subject is a generalized object (e.g., a palm tree) that has a predetermined area or areas of location. In such a scenario, image demand program 122 sets the location for the subject to areas that the subject may appear (e.g., tropical areas or beaches for a palm tree). In other embodiments, an administrator of image demand program 122 provides a geographical location of the landmark. For example, if image demand program 122 is unable to determine a location for a subject, then image demand program 122 may prompt an administrator or operator of server 120 for a location.

Based on the popularity of subjects, image demand program 122 provides suggestions of popular subjects to capture in an image. Furthermore, by providing popular composition factors associated with the subject, image demand program 122 provides the conditions and other factors that would influence the overall popularity of the image. As such, images captured of popular subjects with associated popular composition factors may be more desirable among users, in particular with users from which search data 124 was collected.

In various embodiments, user device 110 includes user program 112 to receive suggestions of popular subjects and associated popular composition factors with the suggested subjects. In some embodiments, user program 112 receives suggestions based on the location or viewing area user device 110 is currently located. In other embodiments, user program 112 receives suggestions based on a profile of the user and the information stored therein. For example, user program 112 receives suggestions based on a travel itinerary or interests of the user.

In some embodiments, user device 110 is a computing device with an attached camera with a display (e.g., a smartphone or digital camera) or a viewfinder (e.g., augmented reality glasses or a film camera). In such embodiments, user program 112 provides suggestions as a user views subjects. User device 110 includes viewing data 114. Viewing data 114 includes information indicating the location and viewing area of user device 110. For example, viewing data 114 includes geographical coordinates (e.g., latitude and longitude) as determined by a positioning device (not shown), such as a Global Positioning System (GPS) sensor. Viewing data 114 may also include information indicating the direction user device 110 is facing (e.g., the viewing area). For example, user device 110 includes a digital compass, accelerometers or gyrometers to determine a viewing area of user device 110.

Based on the current viewing data 114 of user device 110 user program 112 displays a suggestion of image subjects for subjects within the current viewing area of user device 110. For example, a digital camera displays a preview image of a viewing area of the camera such as on a display of the digital camera. User program 112 displays that a popular subject is in view of the camera based on a determination by image demand program 122. Image demand program 122 receives viewing data 114. Image demand program 122 determines the subjects in subject data 126 currently in the viewing area of user device 110 based on the received viewing data 114. Image demand program 122 sends a notification to user program 112 of any popular subjects within the viewing area of user device 110. User program 112 receives the notification of the popular subjects from image demand program 122. User program 112 displays an overlay notification of the suggestion on the display, thereby indicating the popular subject while being viewed by a user of user device 110.

In some embodiments, user device 110 is a computing device such as a laptop or desktop. User program 112 receives suggestions from image demand program 122 and displays the notifications to the user. For example, user program 112 is a web client. User program 112 receives input from a user to navigate to a web page provided by server 120. In one scenario, user program 112 displays suggestions based on the current location of user device 110, a profile in profile data 128 associated with the user, or a combination thereof. Image demand program 122 receives viewing data 114 of user device. Image demand program 122 determines popular subjects within a certain distance of user device 110. In another scenario, image demand program 122 receives profile data 128 associated with the user of user device 110. Image demand program 122 determines suggestions based on information indicated by the profile. Profile data 128 includes, but is not limited to, a travel plan or itinerary of the user, previous subjects captured by the user, interests or preferred subjects of the user, a rating of the user, and previous responses made by the user to suggestions generated by image demand program 122.

For example, a travel plan of the user includes times and places the user may be when travelling. Image demand program 122 determines subjects near the locations indicated in the itinerary and generates suggestions for popular subjects nearby. Furthermore, if a given composition factor is changed by the itinerary, then image demand program 122 generates suggestions based on the desired composition factor for a subject. If a user has travel plans to be near a subject at nighttime and the subject has a desired composition factor of images taken during the "evening", then image demand program 122 generates a suggestion for the subject and the desired "evening" composition factor. Image demand program 122 may also generate suggestions based on previous subjects captured by image by a user or interests of the user. Based on current viewing data 114 of the user's device, image demand program 122 determines suggestions of subjects based on the previous captured images or interests of the user in proximity to the location indicated in viewing data 114. In another example, image demand program 122 compares the travel plans of the user to previous captured images or interests of the user to determine suggestions.

Figure 2:
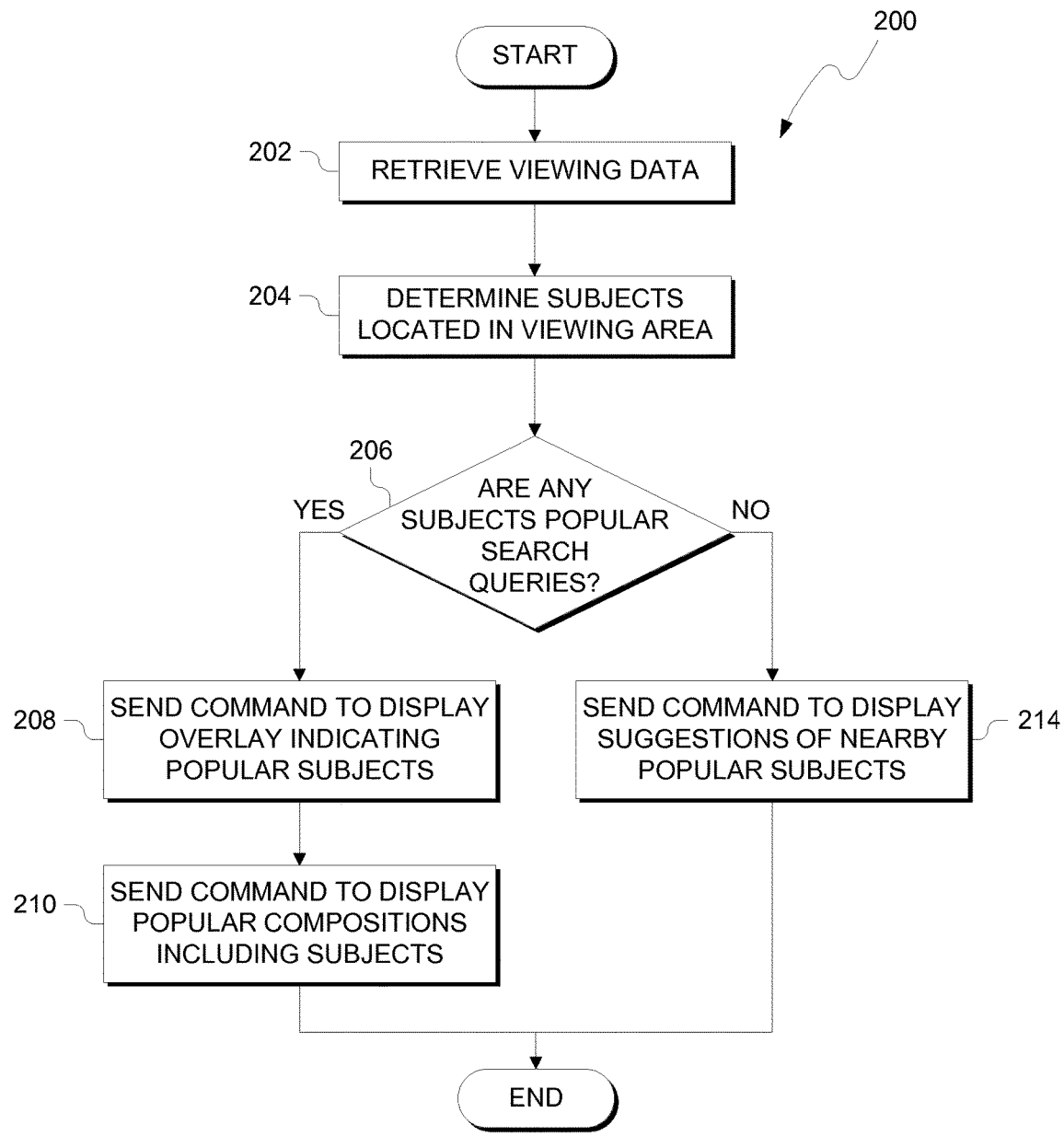
FIG. 2 illustrates operational processes of an image demand program determining demand for images based on viewing data of a user executing on a computing device within the environment of FIG. 1, in accordance with an embodiment of the present invention.

FIG. 2 illustrates operational processes, generally designated 200, of image demand program 122 determining demand for images based on viewing data 114. In process 202, image demand program 122 retrieves viewing data 114 from user device 110. As a user view a given area, user program 112 provides the current viewing data 114 to image demand program 122. Current viewing data 114 includes the position and direction user device 110 is currently located and facing. In process 204, image demand program 122 determines subjects located in the viewing area of user device 110. Image demand program 122 compares the position and facing direction of user device 110, as indicated by viewing data 114, to the location of subjects in subject data 126. In some embodiments, image demand program 122 determines a viewing area based on one or more predetermined viewing constraints. For example, image demand program 122 determines a viewing area based on a viewing angle of the user or user device 110 to generate a viewing are in a cone shape. Furthermore, image demand program 122 limits the distance of the viewing area based on a distance the user can view from the current location (e.g., is the user's view obfuscated or otherwise block by objects or terrain in the area) or a focal distance of a camera (e.g., the furthest distance a camera can view given a certain lens).

In decision process 206, image demand program 122 determines if the subjects in the current viewing area are popular subjects based on subject data 126. As discussed herein, subject data 126 includes various subjects represented by search queries made by a variety of different users. Subject data 126 includes a popularity score or frequency of subjects represented by the search queries stored in search data 124. Additionally, subject data 126 includes a location associated with each subject. Image demand program 122 compares the subjects located in the current viewing area to locations of subjects in subject data 126. For subjects within the viewing area for which subject data 126 is present, image demand program 122 determines if the subjects are popular (e.g., the subject is frequently searched for).

If any subjects within the viewing area are determined to be popular given a popularity score of frequency of the subject is above a threshold value (YES branch of decision process 206), then image demand program 122 sends a command to user program 112 to initiate a display of overlay in the display or viewfinder of user device 110 indicating the popular subject (process 208). For example, if a subject is present in a certain percentage of search queries of search data 124, then image demand program 122 determines the subject is popular. In some embodiments, image demand program 122 displays a popularity rating of the subject that corresponds to the frequency a subject was searched for. In process 210, image demand program 122 sends a command to user program 112 to initiate a display of desired composition factors associated with the subject as part of the overlay. For example, a user pointing a digital camera in various directions. A preview image is displayed on a display of the camera. When a popular subject is within view of the digital camera and displayed on the display, user program 112 of the digital camera displays an overlay indicating the subject, the popularity of the subject and any desired compositions of the subject.

If no subjects within the viewing area are determined to be popular (NO branch of decision process 206), then image demand program 122 sends a command to user program 112 to display suggestions of popular subject that are not in view of user device 110 and nearby the current location of user device 110 (process 214). For example, image demand program 122 determines suggestions for subjects not currently in view but within a predetermined radius of the current position of user device 110. In some embodiments, image demand program 122 determines an ordering of the suggestions based on the popularity of nearby subjects, the proximity of the nearby subjects, or a combination thereof.

Figure 3:
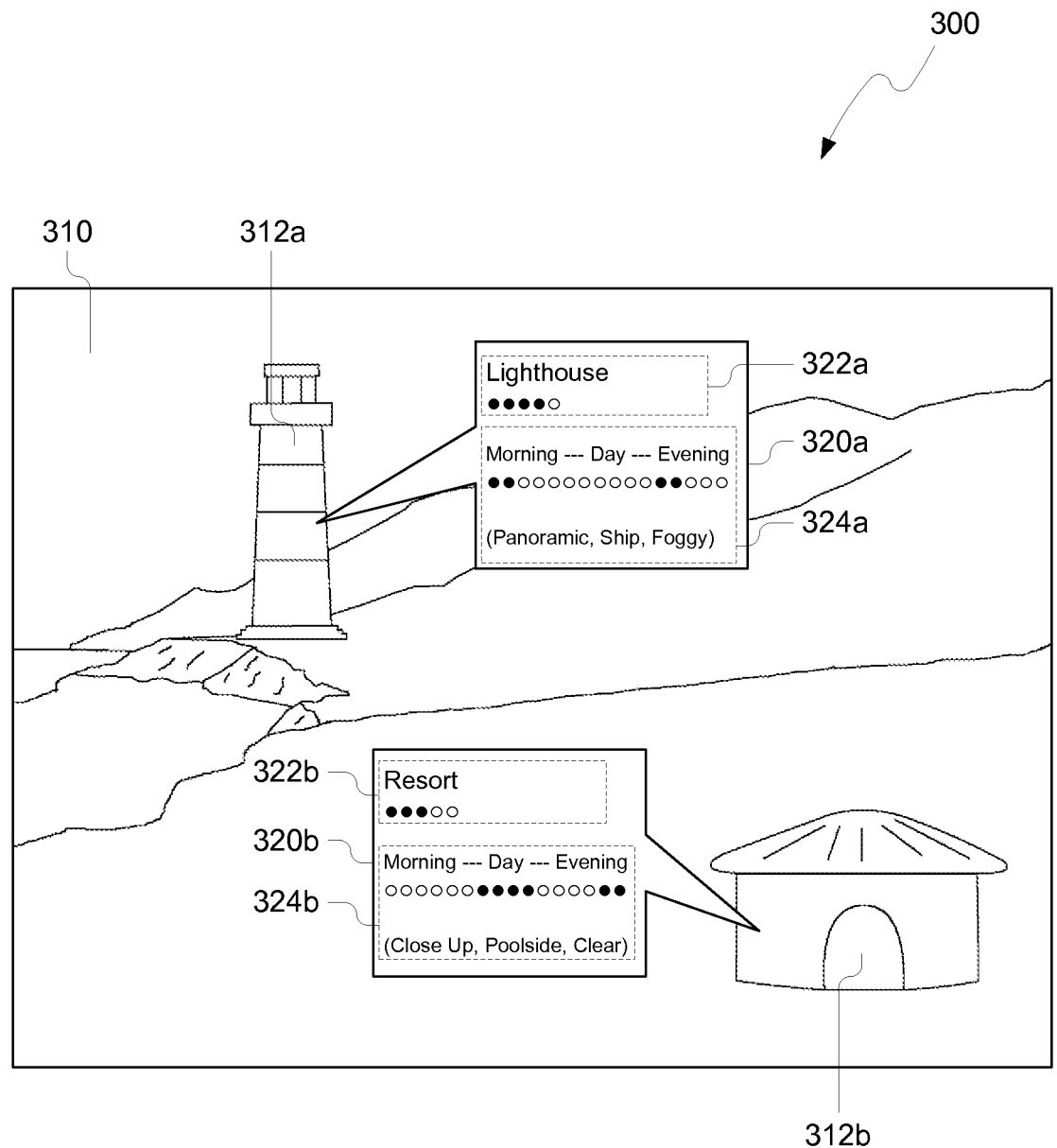
FIG. 3 depicts an example overlay visualization generated by a user program executing on a computing device within the environment of FIG. 1, in accordance with an embodiment of the present invention.

FIG. 3 depicts overlay visualization 300 generated by user program 112. Overlay visualization 300 includes viewing area 310 and overlays 320a-b. Viewing area 310 includes subjects 312a-b. Overlays 320a-b includes subject suggestions 322a-b and subject composition suggestions 324a-b. In some embodiments, viewing area 310 depicts a display of a computing device or digital camera. For example, a smartphone provides a preview of an image captured by a camera device of the smartphone. In such embodiments, user program 112 includes overlays 320a-n in the display of viewing area 310. In other embodiments, viewing area 310 depicts a view of the user through a lens or other viewing apparatus. For example, user device 110 is a pair of augmented reality (AR) glasses. Viewing area 310 is the view captured by the lens or lenses of the AR glasses. In such embodiments, user program 112 displays overlays 320a-b unto the lenses of the AR glasses. Similarly, a film camera includes a viewfinder to view the area captured by the lenses of the film camera. In such a scenario, user program 112 displays overlays 320a-b on the viewfinder.

In this example, subjects 312a-b are currently in viewing area 310. Based on the location and direction of user device 110, and as discussed herein, image demand program 122 determines the popularity of subjects 312a-b based on subject data 126. Image demand program 122 sends a command to user program 112 to display overlays 320a-b for each of the respective subjects 312a-b. The command may also include a name for the subject, a popularity rating for the subject, and popular composition factors associated with the subject. Subject suggestions 322a-b each includes a name for the subject and a popularity rating of the respective subjects 312a-b. Subject composition suggestions 324a-b each includes popular composition factors associated with the respective subjects 312a-b.

In some scenarios, user program 112 lists popular composition factors for a subject based on common words or synonyms found contextually in search data 124 (e.g., Panoramic, Ship, Foggy for overlay 320a associated with subject 312a). In other scenarios, user program 112 provides a visualization of a composition factor, such as a scale for different times of the day. For subject composition suggestion 324b, a composition factor for time of day is visualized with a series of pips representing hours in a day. Darkened pips indicate the demand or popularity of images of the subject for the respective hours of the day. For subject composition suggestion 324b, daytime and late evening hours are popular time for images of subject 312b. Composition suggestions (e.g., subject composition suggestion 324a) provide suggestions to potential image takers, such that resulting images including such composition factors and the subject may be popular among users from which search data 124 is gathered from.

Figure 4:
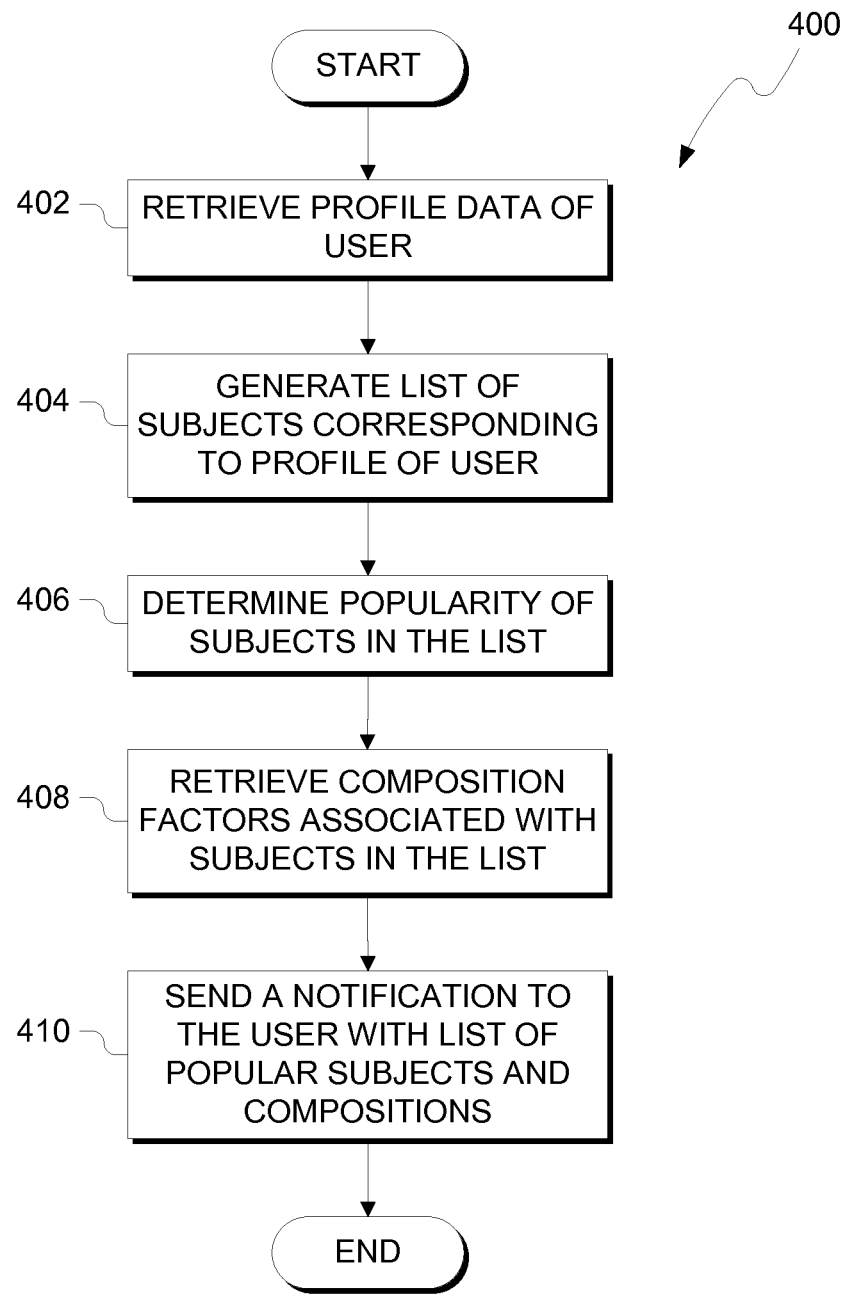
FIG. 4 illustrates operational processes of an image demand program determining demand for images based on profile data of a user executing on a computing device within the environment of FIG. 1, in accordance with an embodiment of the present invention.

FIG. 4 illustrates operational processes, generally designated 400, of image demand program 122 determining demand for images based on profile data 128 of a user. In process 402, image demand program 122 retrieves profile data 128 of a user. In some embodiments, image demand program 122 provides image subject and composition suggestions to a user based on information stored in a profile of a user. Profile data 128 includes, but is not limited to, information regarding a travel plan or itinerary of the user, previous subjects captured by the user, interests or preferred subjects of the user, a rating of the user, and previous responses made by the user to suggestions.

In process 404, image demand program 122 generates a list of subjects from subject data 126 that correspond to a profile of a user. In some embodiments, a profile in profile data 128 includes a travel plan or itinerary. The travel plan includes locations and a user will be visiting or travelling to in the future and the times the visitation will occur. Image demand program 122 determines which subjects in subject data 126 that are within proximity to a location indicated in the travel plan. For example, a user's travel plan in profile data 128 indicates they will be staying at a hotel in a city. In one scenario, image demand program 122 includes subjects in proximity to the hotel (e.g., a museum two blocks away). In another scenario, image demand program 122 includes subjects within the city's borders and within a proximity to the city's borders (e.g., a statue in a park outside the city). In other embodiments, a profile in profile data 128 includes previously captured subjects by a user and interests or preferred subjects of the user associated with the profile. Image demand program 122 determines which subjects in subject data 126 correspond to the previous subjects captured by or subjects of interest for a user. In another embodiment, image demand program 122 generates a list of subjects from subject data 126 that correspond with multiple pieces of information in a profile of a user. For example, image demand program 122 determines which subjects in subject data 126 are both a) near a location indicated in a travel plan of the user and b) are preferred subjects of the user.

In process 406, images demand program 122 determines a popularity or demand for the subjects in the list generated in process 404. Based on search queries in search data 124, image demand program 122 determines a popularity of the subjects that correspond with information in a profile of a user. In some embodiments, a popularity or demand for the subject is previously determined by image demand program 122 and stored in subject data 126. In process 408, determines a popular or demanded composition for each subject in the list generated in process 404. Based on search queries in search data 124, image demand program 122 determines desired composition factors through contextual analysis of the search queries regarding the respective subjects in the list. In some embodiments, desired composition factors is previously determined by image demand program 122 and stored in subject data 126. In process 410, image demand program 122 sends a notification to user program 112 with the list of subjects corresponding to profile data 128 associated with a user of user device 110. The notification includes the popularity of the subjects and desired compositions associated with the subjects. In some embodiments, user program 112 may rank or sort the list by popularity, subjects, subject types, composition factors, or information indicated by the profile of the user (e.g., the list is sorted and displayed based on a timeline indicated by a travel plan of the user).

Figure 5:
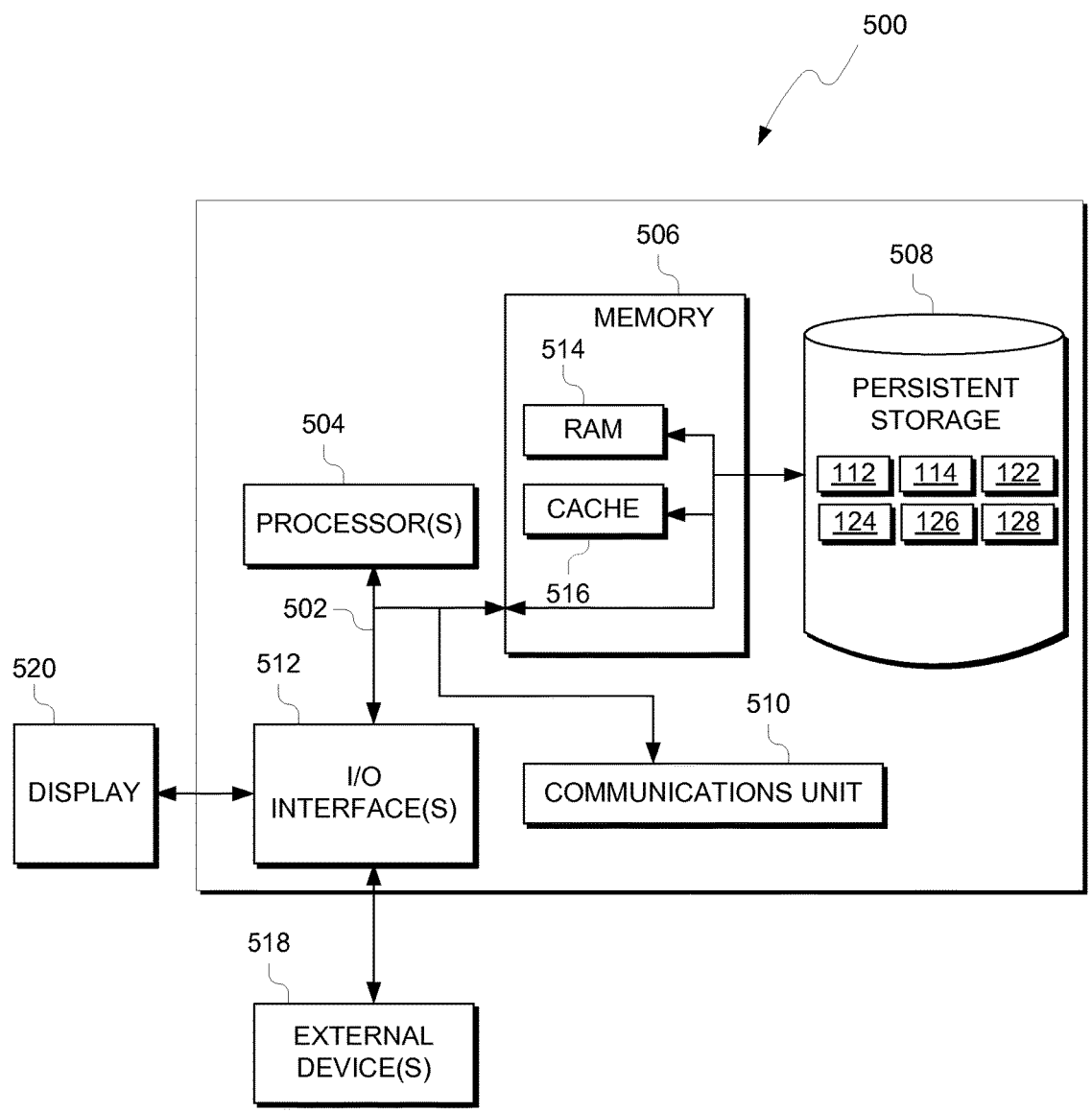
FIG. 5 depicts a block diagram of components of the computing device executing an image demand program and a user program, in accordance with an embodiment of the present invention.

FIG. 5 depicts a block diagram, 500, of components for each of user device 110 and server 120, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

User device 110 and server 120 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

User program 112, viewing data 114, image demand program 122, search data 124, subject data 126 and profile data 128 are stored in persistent storage 508 of user device 110 and server 120, respectively, for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 130. In these examples, communications unit 510 includes one or more network interface cards. Communications unit 510 may provide communications through the use of either or both physical and wireless communications links. User program 112, viewing data 114, image demand program 122, search data 124, subject data 126 and profile data 128 may be downloaded to persistent storage 508, of either user device 110 or server 120, through communications unit 510.

I/O interface(s) 512 allows for input and output of data with other devices that may be connected to user device 110 or server 120. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., user program 112, viewing data 114, image demand program 122, search data 124, subject data 126 and profile data 128, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   receiving, by one or more processors, a first subject of potential interest data set including information indicative of: (i) identification of a first subject of potential interest with respect to image capturing, and (ii) a first current location of the first subject of potential interest;
   receiving current first user location data including information indicative of a current location of the first user;
   determining, by the one or more processors, that the first current location of the first subject of potential interest is within a predefined proximity to the current location of the first user;
   generating, by the one or more processors, a plurality of subject of potential interest data sets including the first subject of potential interest data set, with each subject of potential data set including information indicative of: (i) identification of a respectively corresponding subject of potential interest with respect to image capturing, (ii) the first current location of the subject of potential interest, and (iii) a popularity score indicating relative popularity with respect to capturing images of the respectively corresponding subject of potential interest;
   determining, by the one or more processors, that a first popularity score of the first subject of potential interest data set is above a predetermined threshold; and
   sending, by the one or more processors and to the first user, a recommendation that the first user capture an image of the first subject of potential interest, based, at least in part, upon the determination that the first current location of the subject of potential interest is within a predefined proximity to the first current location of the first user;
   wherein the sending of the recommendation that the first user capture an image of the subject of potential interest, is further based, at least in part, upon the determination that the first popularity score is above the predetermined threshold.

2. The method of claim 1 wherein the popularity scores indicate the frequency the respectively corresponding subject of potential interest was searched for.

3. The method of claim 2 further comprising:
receiving a search data set including information indicative of a plurality of search queries relating to at least some of the subjects of potential interest submitted by a plurality of users; and
for each given popularity score respectively corresponding to each given subject of potential interest data set, determining, by the one or more processors, the given popularity score based, at least in part, upon frequency with which the respectively corresponding subject of potential interest appears in the search data set.

4. The method of claim 2 further comprising:
receiving a search data set including information indicative of a plurality of search queries relating to at least some of the subjects of potential interest submitted by the first user; and
for each given popularity score respectively corresponding to each given subject of potential interest data set, determining, by the one or more processors, the given popularity score based, at least in part, upon frequency with which the respectively corresponding subject of potential interest appears in the search data set.

5. The method of claim 2 further comprising:
receiving a search data set including information indicative of a plurality of search queries relating to at least some of the subjects of potential interest submitted by the first user and a plurality of other users; and
for each given popularity score respectively corresponding to each given subject of potential interest data set, determining, by the one or more processors, the given popularity score based, at least in part, upon both of the following: (i) frequency with which the respectively corresponding subject of potential interest appears in queries submitted by the first user, and (ii) frequency with which the respectively corresponding subject of potential interest appears in queries submitted by the plurality of other users.

6. The method of claim 1 further comprising:
receiving a first user profile data set including information indicative of a plurality of subjects; and
generating, by the one or more processors, a plurality of subject of potential interest data sets including the first subject of potential interest data set, with each subject of potential interest data set including information indicative of: (i) identification of a respectively corresponding subject of potential interest with respect to image capturing, and (ii) the first current location of the subject of potential interest;
wherein the generation of the first subject of potential interest data set includes the determination of the first subject of potential interest based, at least in part, upon the first user profile data set.

7. A computer program product comprising:
a machine readable storage device; and
computer code stored on the machine readable storage device, with the computer code including instructions for causing a processor(s) set to perform operations including the following:
receiving, by one or more processors, a first subject of potential interest data set including information indicative of: (i) identification of a first subject of potential interest with respect to image capturing, and (ii) a first current location of the first subject of potential interest,
receiving current first user location data including information indicative of a current location of the first user,
determining, by the one or more processors, that the first current location of the first subject of potential interest is within a predefined proximity to the current location of the first user,
generating, by the one or more processors, a plurality of subject of potential interest data sets including the first subject of potential interest data set, with each subject of potential data set including information indicative of: (i) identification of a respectively corresponding subject of potential interest with respect to image capturing, (ii) the first current location of the subject of potential interest, and (iii) a popularity score indicating relative popularity with respect to capturing images of the respectively corresponding subject of potential interest,
determining, by the one or more processors, that a first popularity score of the first subject of potential interest data set is above a predetermined threshold, and
sending, by the one or more processors and to the first user, a recommendation that the first user capture an image of the first subject of potential interest, based, at least in part, upon the determination that the first current location of the subject of potential interest is within a predefined proximity to the first current location of the first user;
wherein the sending of the recommendation that the first user capture an image of the subject of potential interest, is further based, at least in part, upon the determination that the first popularity score is above the predetermined threshold.

8. The computer program product of claim 7 wherein the popularity scores indicate the frequency the respectively corresponding subject of potential interest was searched for.

9. The computer program product of claim 8 further comprising:
receiving a search data set including information indicative of a plurality of search queries relating to at least some of the subjects of potential interest submitted by a plurality of users; and
for each given popularity score respectively corresponding to each given subject of potential interest data set, determining, by the one or more processors, the given popularity score based, at least in part, upon frequency with which the respectively corresponding subject of potential interest appears in the search data set.

10. The computer program product of claim 8 further comprising:
receiving a search data set including information indicative of a plurality of search queries relating to at least some of the subjects of potential interest submitted by the first user; and
for each given popularity score respectively corresponding to each given subject of potential interest data set, determining, by the one or more processors, the given popularity score based, at least in part, upon frequency with which the respectively corresponding subject of potential interest appears in the search data set.

11. The computer program product of claim 8 further comprising:
receiving a search data set including information indicative of a plurality of search queries relating to at least some of the subjects of potential interest submitted by the first user and a plurality of other users; and for each given popularity score respectively corresponding to each given subject of potential interest data set, determining, by the one or more processors, the given popularity score based, at least in part, upon both of the following: (i) frequency with which the respectively corresponding subject of potential interest appears in queries submitted by the first user, and (ii) frequency with which the respectively corresponding subject of potential interest appears in queries submitted by the plurality of other users.

12. The computer program product of claim 7 further comprising:
receiving a first user profile data set including information indicative of a plurality of subjects; and
generating, by the one or more processors, a plurality of subject of potential interest data sets including the first subject of potential interest data set, with each subject of potential interest data set including information indicative of: (i) identification of a respectively corresponding subject of potential interest with respect to image capturing, and (ii) the first current location of the subject of potential interest;
wherein the generation of the first subject of potential interest data set includes the determination of the first subject of potential interest based, at least in part, upon the first user profile data set.

13. A computer system comprising:
a processor(s) set;
a machine readable storage device; and
computer code stored on the machine readable storage device, with the computer code including instructions for causing the processor(s) set to perform operations including the following:
receiving, by one or more processors, a first subject of potential interest data set including information indicative of: (i) identification of a first subject of potential interest with respect to image capturing, and (ii) a first current location of the first subject of potential interest,
receiving current first user location data including information indicative of a current location of the first user,
determining, by the one or more processors, that the first current location of the first subject of potential interest is within a predefined proximity to the current location of the first user,
generating, by the one or more processors, a plurality of subject of potential interest data sets including the first subject of potential interest data set, with each subject of potential data set including information indicative of: (i) identification of a respectively corresponding subject of potential interest with respect to image capturing, (ii) the first current location of the subject of potential interest, and (iii) a popularity score indicating relative popularity with respect to capturing images of the respectively corresponding subject of potential interest,
determining, by the one or more processors, that a first popularity score of the first subject of potential interest data set is above a predetermined threshold, and
sending, by the one or more processors and to the first user, a recommendation that the first user capture an image of the first subject of potential interest, based, at least in part, upon the determination that the first current location of the subject of potential interest is within a predefined proximity to the first current location of the first user;
wherein the sending of the recommendation that the first user capture an image of the subject of potential interest, is further based, at least in part, upon the determination that the first popularity score is above the predetermined threshold.

14. The computer system of claim 13 wherein the popularity scores indicate the frequency the respectively corresponding subject of potential interest was searched for.

15. The computer system of claim 14 further comprising:
receiving a search data set including information indicative of a plurality of search queries relating to at least some of the subjects of potential interest submitted by a plurality of users; and
for each given popularity score respectively corresponding to each given subject of potential interest data set, determining, by the one or more processors, the given popularity score based, at least in part, upon frequency with which the respectively corresponding subject of potential interest appears in the search data set.

16. The computer system of claim 14 further comprising:
receiving a search data set including information indicative of a plurality of search queries relating to at least some of the subjects of potential interest submitted by the first user; and
for each given popularity score respectively corresponding to each given subject of potential interest data set, determining, by the one or more processors, the given popularity score based, at least in part, upon frequency with which the respectively corresponding subject of potential interest appears in the search data set.

17. The computer system of claim 14 further comprising:
receiving a search data set including information indicative of a plurality of search queries relating to at least some of the subjects of potential interest submitted by the first user and a plurality of other users; and
for each given popularity score respectively corresponding to each given subject of potential interest data set, determining, by the one or more processors, the given popularity score based, at least in part, upon both of the following: (i) frequency with which the respectively corresponding subject of potential interest appears in queries submitted by the first user, and (ii) frequency with which the respectively corresponding subject of potential interest appears in queries submitted by the plurality of other users.

18. The computer system of claim 13 further comprising:
receiving a first user profile data set including information indicative of a plurality of subjects; and
generating, by the one or more processors, a plurality of subject of potential interest data sets including the first subject of potential interest data set, with each subject of potential interest data set including information indicative of: (i) identification of a respectively corresponding subject of potential interest with respect to image capturing, and (ii) the first current location of the subject of potential interest;
wherein the generation of the first subject of potential interest data set includes the determination of the first subject of potential interest based, at least in part, upon the first user profile data set.

* * * * *